United States Patent
Audebert et al.

(10) Patent No.: US 7,085,386 B2
(45) Date of Patent: Aug. 1, 2006

(54) SYSTEM AND METHOD FOR SECURE REPLACEMENT OF HIGH LEVEL CRYPTOGRAPHIC KEYS IN A PERSONAL SECURITY DEVICE

(75) Inventors: Yves Audebert, Los Gatos, CA (US); Wu Wen, Santa Clara, CA (US)

(73) Assignee: Activcard, Suresnes Cedex (FR)

( * ) Notice: Subject to any disclaimer, the term of this patent is extended or adjusted under 35 U.S.C. 154(b) by 998 days.

(21) Appl. No.: 10/004,836

(22) Filed: Dec. 7, 2001

(65) Prior Publication Data
US 2003/0108204 A1 Jun. 12, 2003

(51) Int. Cl.
*H04L 9/00* (2006.01)

(52) U.S. Cl. .................. 380/281; 380/277; 380/278; 713/171

(58) Field of Classification Search .............. 380/282, 380/281, 278
See application file for complete search history.

(56) References Cited

U.S. PATENT DOCUMENTS

| | | | |
|---|---|---|---|
| 4,972,472 A | | 11/1990 | Brown et al. |
| 5,081,677 A * | | 1/1992 | Green et al. ............... 380/281 |
| 5,144,664 A | | 9/1992 | Esserman et al. |
| 5,680,458 A * | | 10/1997 | Spelman et al. ........... 380/277 |
| 5,761,306 A * | | 6/1998 | Lewis ........................ 380/282 |
| 5,825,880 A * | | 10/1998 | Sudia et al. ................ 713/180 |
| 5,937,066 A | | 8/1999 | Gennaro et al. |
| 6,058,477 A | | 5/2000 | Kusakabe et al. |
| 6,230,267 B1 * | | 5/2001 | Richards et al. ........... 713/172 |
| 6,240,187 B1 * | | 5/2001 | Lewis ........................ 380/282 |
| 6,240,512 B1 * | | 5/2001 | Fang et al. ................. 713/150 |
| 6,243,816 B1 * | | 6/2001 | Fang et al. ................... 726/5 |
| 6,367,011 B1 * | | 4/2002 | Lee et al. ................... 713/172 |
| 2003/0086571 A1 * | | 5/2003 | Audebert et al. ........... 380/277 |

FOREIGN PATENT DOCUMENTS

EP 1008989 6/2000
JP 10171717 6/1998

OTHER PUBLICATIONS

"Hardware Security Module", nCipher whitepaper, Mar. 2001.
David Cross, Microsoft Corporation and William A. Franklin, nCipher, Incorporated, "Windows 2000 Server and PKI: Using the nCipher Hardware Security Module", Apr. 7, 2001.
International Search Report dated May 28, 2003.

* cited by examiner

*Primary Examiner*—Kambiz Zand
*Assistant Examiner*—Samson Lemma
(74) *Attorney, Agent, or Firm*—Stevens, Davis, Miller & Mosher, LLP

(57) ABSTRACT

A data processing system and method for generating and installing a master key replacement key and a new master key post issuance without using a potentially compromised master key to access a PSD's security executive.

32 Claims, 7 Drawing Sheets

SYSTEM AND METHOD FOR SECURE REPLACEMENT OF HIGH LEVEL CRYPTOGRAPHIC KEYS IN A PERSONAL SECURITY DEVICE

FIELD OF INVENTION

The present invention relates to a data processing system and method for replacing root cryptographic keys installed inside a personal security device without requiring the use of potentially compromised root keys.

BACKGROUND OF INVENTION

There is considerable knowledge in the current art involving cryptographic key replacement strategies for issued personal security devices (PSD) such as smart cards, subscriber identification modules (SIM), wireless identification modules (WIM), identification tokens, integrated circuit cards (IC cards) and related devices. Most replacement strategies rely on the use of the installed keys in order to perform key replacements, which may allow a fraudulent key holder to monitor the key replacement and thus potentially compromise the replacement keys. For example, U.S. Pat. Nos. 6,240,187 and 5,761,306 by Lewis describe sophisticated mechanisms to perform asymmetric key replacements incorporating sequential key generation and cryptographic techniques in order to securely send the replacement keys over an open network to a PSD. The sequential key replacements are dependent on currently installed keys.

In another approach, U.S. Pat. No. 6,230,267 by Richards, et al. describes a secure data loading process which could be extended to installing asymmetric keys and the preferable use of properly authenticated digital certificates to ensure that data stored inside a PSD has not been compromised. The approach taught by the Richards patent is effective for domain level key replacements but is not intended for use in replacing compromised high level key sets such as root keys or master keys. Again, the data transfer arrangement relies on the integrity of existing keys in order to ensure a secure data transfer.

In a third approach, U.S. Pat. No. 4,972,472 by Brown, et al. incorporates three separate cryptographic keys having active, retired and replacement status respectively. This key replacement strategy requires a secure channel in order to perform the key replacements and could allow a compromised key set to remain active for a predetermined period before being "retired." Another limitation in employing this approach is the lack of a secure key replacement mechanism, which ensures the integrity of the installed keys. The intent of the Brown patent is to provide a transition period for normal key replacements.

A fourth approach is described in U.S. Pat. No. 5,680,458 by Spelman et al. where notification and replacement of a compromised asymmetric root key are performed using an out-of-band mechanism and having each PSD holder enter a key sequence which forms a partial replacement key. This viable approach relies on time consuming and potentially costly out-of-band notifications and end user intervention in order to change a potentially compromised root key.

Other common alternatives include returning the PSDs to the issuer for key exchanges; however, this removes the PSDs from service and impacts the PSD's end users. The final alternative is to simply dispose of the current PSDs and issue replacements, which is an expensive solution and may result in loss of customized data stored in the issued PSDs.

Little is disclosed in the current or prior art concerning secure recovery from the loss or compromise of a hardware security module (HSM), which may contain the master keys or the ability to generate master keys for issued PSDs. The loss or compromise of an active HSM is a particularly difficult and costly situation to remedy. Thus it is apparent that a secure root level key replacing technique which does not rely on currently active key sets or user intervention and can be performed using existing communications infrastructures is highly desirable. A method and system is described herein, which solves several of the limitations described above.

SUMMARY OF INVENTION

Cryptographic key replacement attempts to securely replace key sets already deployed with newly generated key sets in the event that the currently deployed key sets becomes compromised. A distinction is made from normal updating of keys before a pre-determined key's valid period expires. In the later case, a new set of keys can be securely installed using the expiring keys. For the former, it is not be appropriate to replace the compromised key using the compromised key itself due to the ability of the fraudulent key holder to monitor the key replacement process.

This invention provides a system and method for generating, installing and activating a high level key set, which is intended to replace a currently active high level key set without requiring the use of the currently active high level key to perform the key replacement.

To practice this invention, two high level keys are initially installed and registered with the internal PSD security executive during the PSD's initial personalization phase; one key is used as a master key, the second is used as a master key replacement key. The master key replacement key allows access to the PSD in order to securely replace a potentially compromised master key.

During the personalization stage, a diversification secret is generated and associated with a PSD or group of PSDs by use of the PSD's masked identification number commonly referred to as a PSD identification number or PSD ID. The diversification secret is used to generate a master key replacement key. The diversification secret may be generated using a random number generator or other equivalent means, which produces a sufficiently robust data block.

Once the master key replacement key has been generated, the diversification secret is encrypted with a key management system public key and the resulting cryptogram is stored on a secure server. The key management system's private key is retained in a secure location usually within the secure domain of the key management system's hardware security module (HSM.)

In the preferred embodiment of the invention, generation of diversification secrets and encryption with the key management system's public key(s) occur within the secure domain of one or more of the access server's HSM(s). It is also envisioned that the encrypted diversification secret(s) may be stored online on a local hard disk or offline using a compact disk (CD).

In the event it becomes necessary to perform a master key replacement due to an actual or potential high level key compromise, the appropriate encrypted diversification secret(s) are retrieved from storage using the affected PSD's identification number(s) as a cross reference. The secret(s) are then decrypted using the key management system's private key, used to diversify the recovered master key replacement key data block, which regenerates the master key replacement key(s.) A new master key set is generated using a new master key data block diversified using the PSD's identification number.

A secure channel is then established between the access server's HSM and the PSD(s) containing the compromised master keys. The master key replacement keys are then used to access the card executive, delete the compromised master key(s) and install the replacement master key(s). It is also envisioned that a new set of key replacement keys may be generated and installed in the PSDs following the master key replacement(s).

DETAILED DESCRIPTION OF PREFERRED EMBODIMENT

This invention describes a method and system to generate a replacement key used to securely access a personal security device (PSD) in the event a security executive level key becomes compromised, for example a PSD master key.

In the preferred embodiment of the invention, a first server equipped with a hardware security module (HSM) is connected to one or more clients over a telecommunications network. The first server performs the routine authentication and cryptography service for clients connected over a telecommunications network and is hereinafter referred to as an access server. A second server, equipped with another HSM, performs cryptographic key management and is hereinafter referred to as a key management server. The physical location and arrangement of the servers is intended to minimize theft or compromise of the HSMs.

Figure 1A:
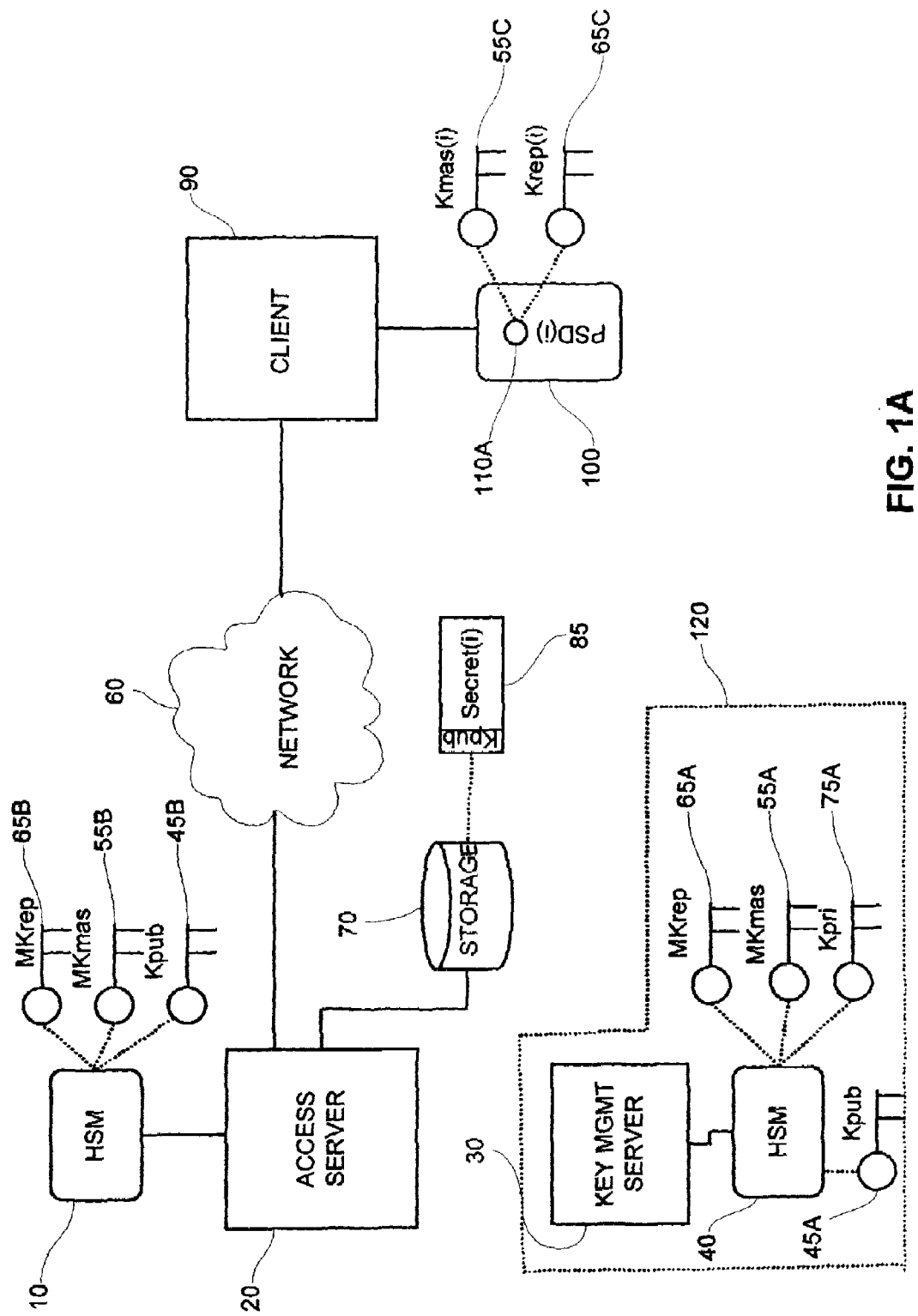
FIG. 1A—is a general system block diagram for implementing the present invention. This figure depicts the general system arrangement following the initial injection of a PSD master key and a master key replacement key.

Referring to FIG. 1A, the preferred embodiment of the invention is shown where a first HSM 10 associated with an access server 20 has previously been initialized at the secure key management server site 120. The access server HSM 10 contains a public key Kpub 45B, a master key data block MKmas 55B and a master key replacement key data block MKrep 65B. Details of the initialization process are provided in the discussion for FIG. 1B.

The access server 20 and associated HSM 10 are interconnected over a telecommunications network 60 with a client 90 and associated PSD(i) 100. The telecommunications network 60 includes both open and private network arrangements. During key replacements, the access server 20 and client 90 roles are limited to maintaining a secure communications channel between the HSM 10 and PSD(i) 100, thus maximizing end-to-end security. The access server 20 includes storage 70 capabilities for storing an encrypted diversification secret 85. The storage 70 may include both online and offline mechanisms.

The PSD(i) 100 includes a unique master key Kmas(i) 55C and a unique key replacement key Krep(i) 65C generated by the access server HSM 10 and securely injected into the PSD100. In the preferred embodiment of the invention, both the master key Kmas(i) 55C and the master key replacement key Krep(i) 65C are injected into the PSD(i) 100 during the pre-issuance personalization stage. It is also envisioned that the master key replacement key Krep(i) 65C may be installed post issuance using Kmas(i) 55C to allow access to the PSD security executive.

In the preferred embodiment of the invention, the key management server 30 is maintained in a secure location 120 and operates as a centralized offline facility for managing the overall key management system. Associated with the key management system is a second HSM 40 containing a private key Kpri 75A, which is the counterpart to Kpub 45B, a master key data block MKmas 55A and a master key replacement key data block MKrep 65A. The original public key Kpub 45A may also be stored within this HSM 40 or locally stored on the key management server.

In an alternate embodiment (not shown) of the invention, the access server 20 performs the same role as the key management server 30. In this alternate embodiment of the invention, a key management HSM 40 generates the Kpri 75A, Kpub 45A, MKmas 55A and Mkrep 65A. The key information Kpub 75A MKmas 55A and MKrep 65A are then securely transferred to an access server HSM 10 and stored in non-volatile memory. The key management HSM 40 is then removed from the access server 20 and securely stored under lock and key until required for master key replacement.

Figure 1B:
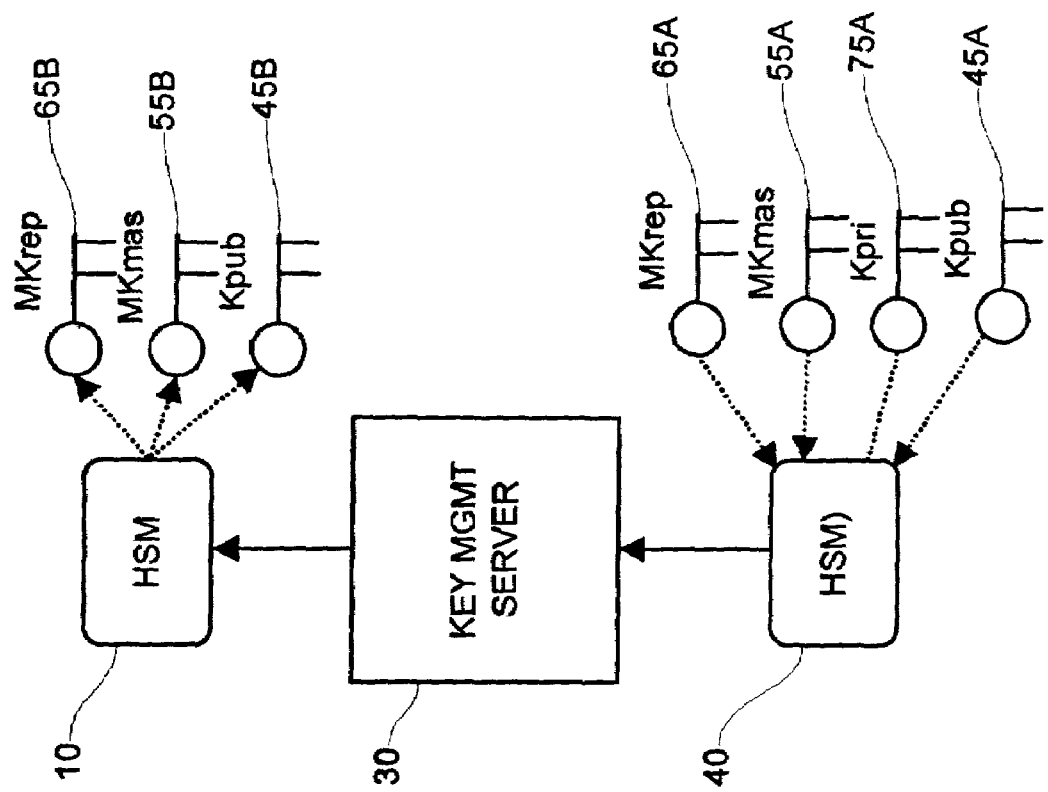
FIG. 1B—is a detailed block diagram illustrating the initialization of an access server HSM using a key management server and a second HSM associated with the key management server.

Referring to FIG. 1B, the access server HSM 10 initialization process is depicted where a copy of the following information is transferred from the key management server HSM 40: a public key Kpub 45A, the master key data block MKmas 55A and the master key replacement key data block MKrep 65A. The private key Kpri 75A remains inside the secure domain of the key management system HSM 40 until required for master key replacement. The information transferred to the access server HSM 10 are identified as public key Kpub 45B, master key data block MKmas 55B and master key replacement key data block MKrep 65B respectively.

Figure 2:
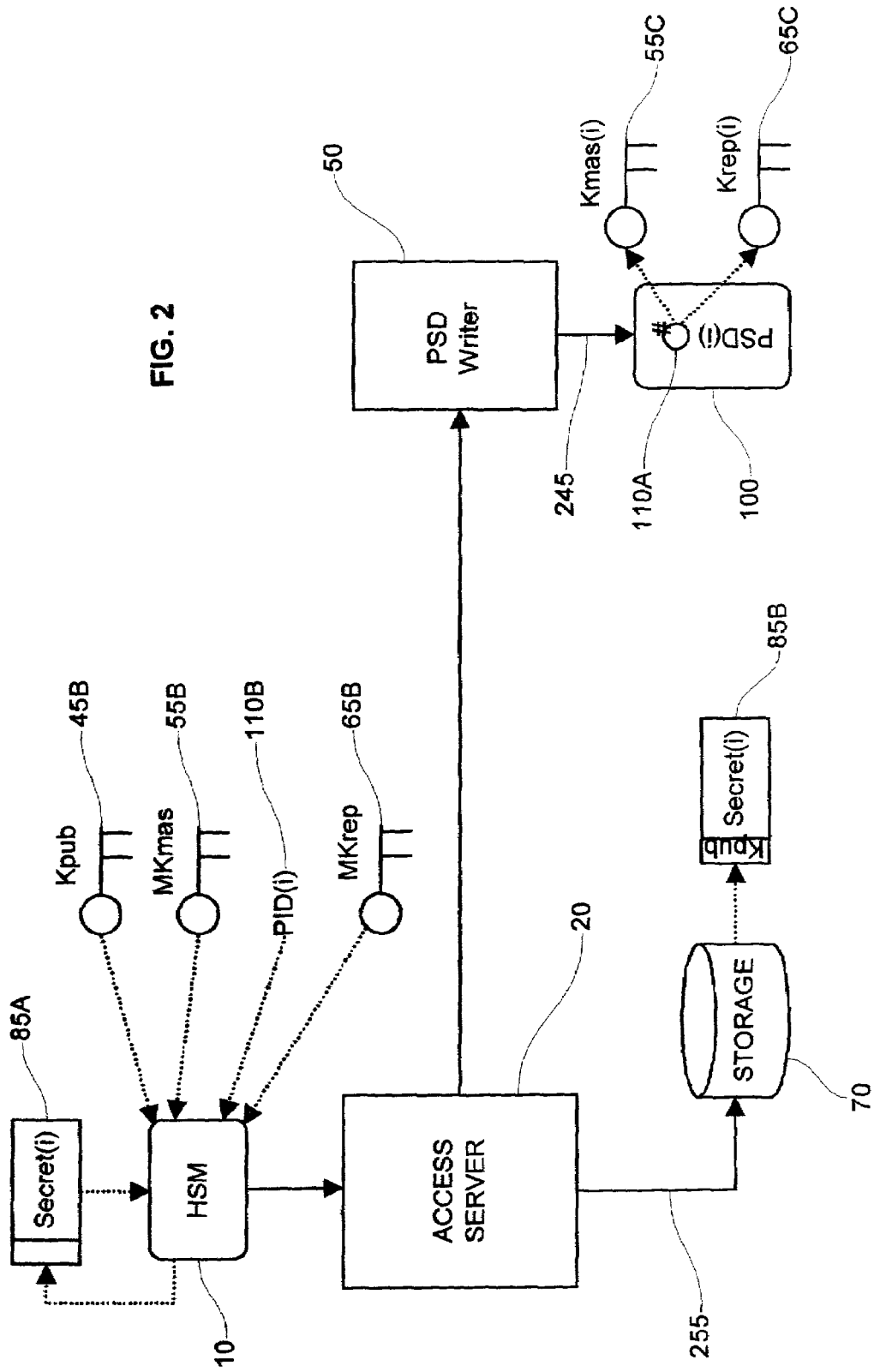
FIG. 2—is a detailed block diagram illustrating the inclusion of a master key and a replacement key inside a personal security device during the initial personalization phase.

In FIG. 2, the initial PSD personalization process is shown which incorporates an initial master key Kmas(i) 55C and a master key replacement key Krep(i) 65C inside the secure domain of a PSD(i) 100. The master key Kmas(i) 55C is generated by diversifying the master key data block MKmas 55B using the PSD identification number PID(i) 110B. Once generated, Kmas(i) 55C is then securely transferred from the access server HSM 10 through the access server 20 to a PSD writer 50 where Kmas(i) 55C is securely injected 245 into the PSD(i) 100. Depending on the entity performing the PSD personalization, the PSD manufacturer's master key may be required in order to inject Kmas(i)

55C into the PSD(i) 100. In this case, the process reverts to a normal master key replacement, which is known in the art.

The personalization process includes generation of a secret 85A by the access server HSM 10. In the preferred embodiment, the secret 85A is generated using a random number generator. The master key replacement key Krep(i) 65C is generated by diversifying the master key replacement key data block MKrep 65B with the secret 85A. Krep(i) 65C is then securely transferred from the access server HSM 10 through the access server 20 to the PSD writer 50 where Krep(i) 65C is securely injected 245 into the PSD(i) 100. As before, depending on the entity performing the PSD personalization, the PSD manufacturer's master key may be required in order to inject Krep(i) 65C into the PSD(i) 100. In this case, the process reverts to a normal master key replacement, which is known in the art. The order of injection of Kmas(i) 55C or Krep(i) 65C is not critical to the invention.

Once the master key replacement key Krep(i) 65C has been generated, the secret (random number) 85A is encrypted by the access server HSM 10 using the public key Kpub 45B and cross-referenced with the PSD identification number PID(i) 110B. Once the secret 85A has been encrypted using Kpub 45B, the secret is deleted without leaving the secure domain of the access server HSM 10. The encrypted secret 85B is transferred 255 to the access server 20 and stored in a secure storage location 70. Cross-referencing the PSD's identification number PID 110A is used to retrieve the encrypted secret 85B.

Figure 3A:
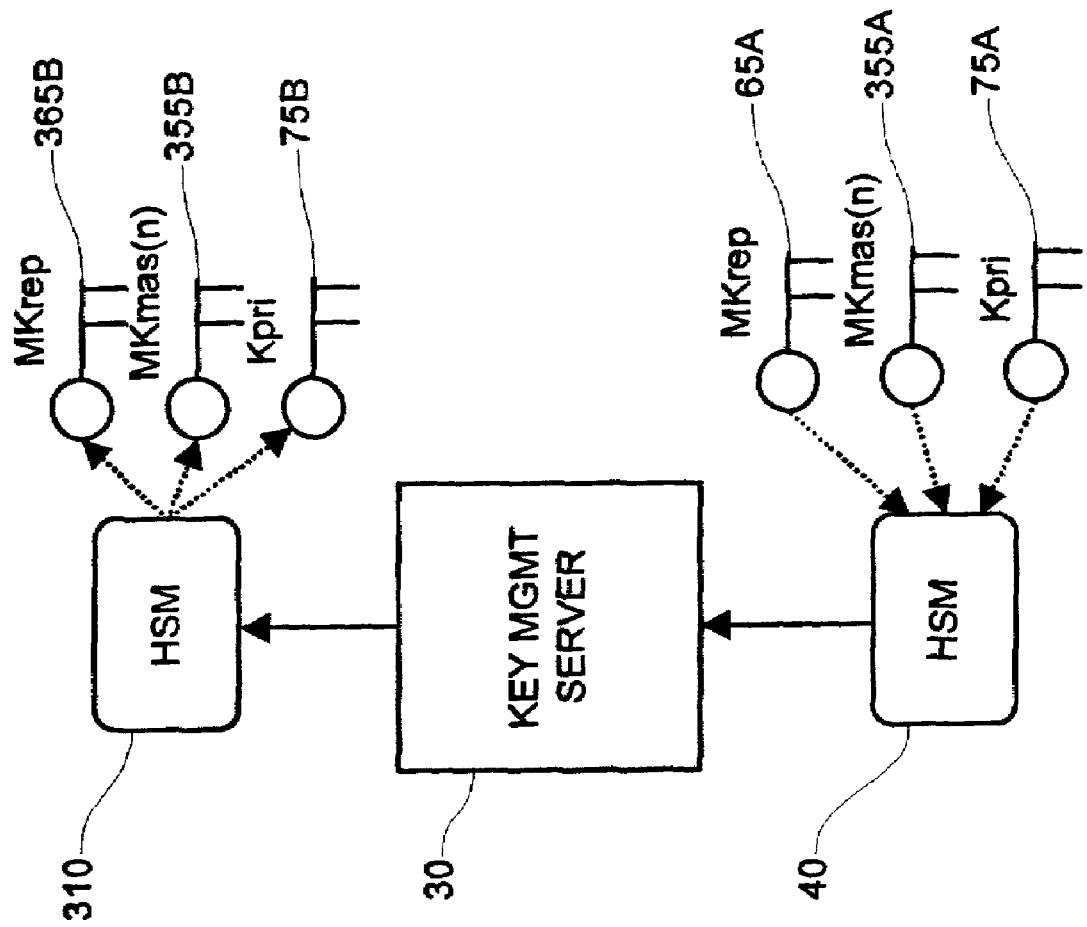
FIG. 3A—is a detailed block diagram illustrating the initialization of a replacement access server HSM using a key management server and a second HSM associated with the key management server with the intention of replacing existing master keys.

Referring to FIG. 3A, a post issuance replacement hardware security module initialization process is shown. In the preferred embodiment of the invention, new replacement master key generating data MKmas(n) 355A is generated by the key management server HSM 40. A replacement access server HSM 310 is initialized by the key management server 30 by transferring a copy of the new master key data block MKmas(n) 355A, a copy of the original master key replacement key data block MKrep 65A and a copy of the private key Kpri 75A from the key management server HSM 40 to the replacement access server HSM 310. Optionally, a new public and private key pair and a new master key replacement key data block may be generated as well to replace the existing key pairs and data blocks following the master key replacement process. The initialized replacement access server HSM 310 is then connected to the access server 20.

Figure 3B:
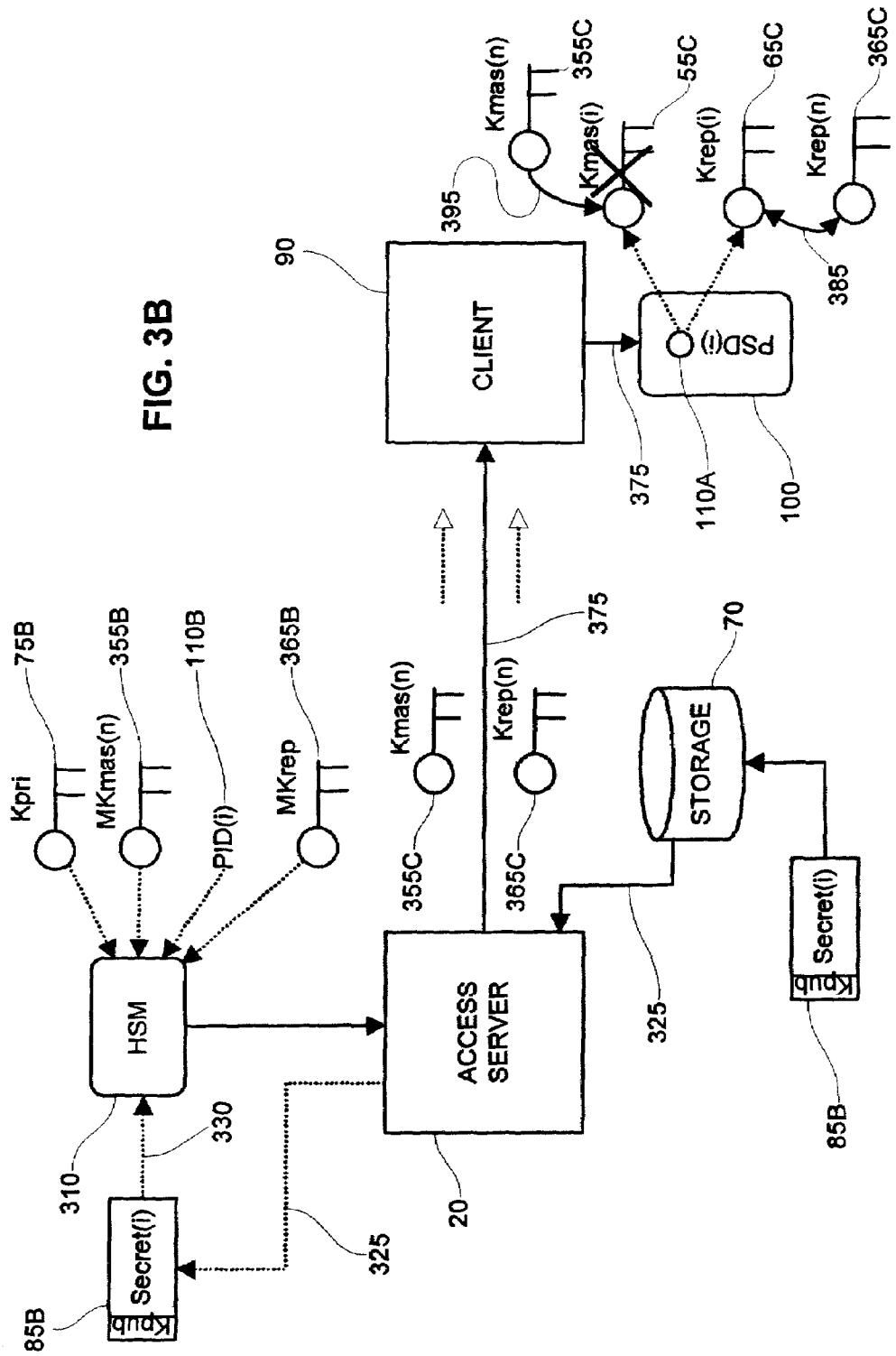
FIG. 3B—is a detailed block diagram illustrating the regeneration of the replacement key, unlocking the target PSD security executive with the replacement key, deletion of the master key and replacement with a new master key.

Referring to FIG. 3B, a post issuance master key replacement process is shown. The PSD(i) 100 is connected to the client 90 which causes the PSD's identification number PID(i) 110A to be retrieved and to be returned 110B to the access server 20. A secure communications channel is then established between the replacement access server HSM 310 and the PSD(i) 100. The access server 20 then retrieves 325 the appropriate encrypted secret 85B from storage 70 for the target PSD(i) 100 by the PSD's associated internal identification number PID(i) 110B. The encrypted secret 85B is then transferred 330 into the replacement access server HSM 310 where the encrypted secret 85B is decrypted using the private key Kpri 75B. The resultant secret is then used to diversify the master key replacement key data block MKrep 365B, regenerating the master key replacement key Krep(n). A new master key is generated as before by diversifying the new master key data block MKmas(n) 355B with the PSD's associated internal identification number PID(i) 110B resulting in the new master key Kmas(n) 355.

The master key replacement key Krep(n) 365B and the new master key Kmas(n) 355B are then securely sent 375 to the PSD(i) 100. To delete the existing master key Kmas(i) 55C, the regenerated key replacement key Krep(n) 365C is validated 385 by the existing replacement key Krep(i) 65C. If Krep(n) 365C matches Krep(i) 65C, access is granted to the PSD's security executive where the existing master key Kmas(i) 55C is deleted and replaced 395 by Kmas(n) 355C, otherwise the attempted replacement process terminates unsuccessfully. Once the new master key Kmas(n) 355C is installed and registered with the PSD's security executive, the PSD(i) 100 is relocked preventing further access and the secure channel 410 is terminated. Optionally, a new key replacement key may be installed before the security executive is relocked.

Figure 4:
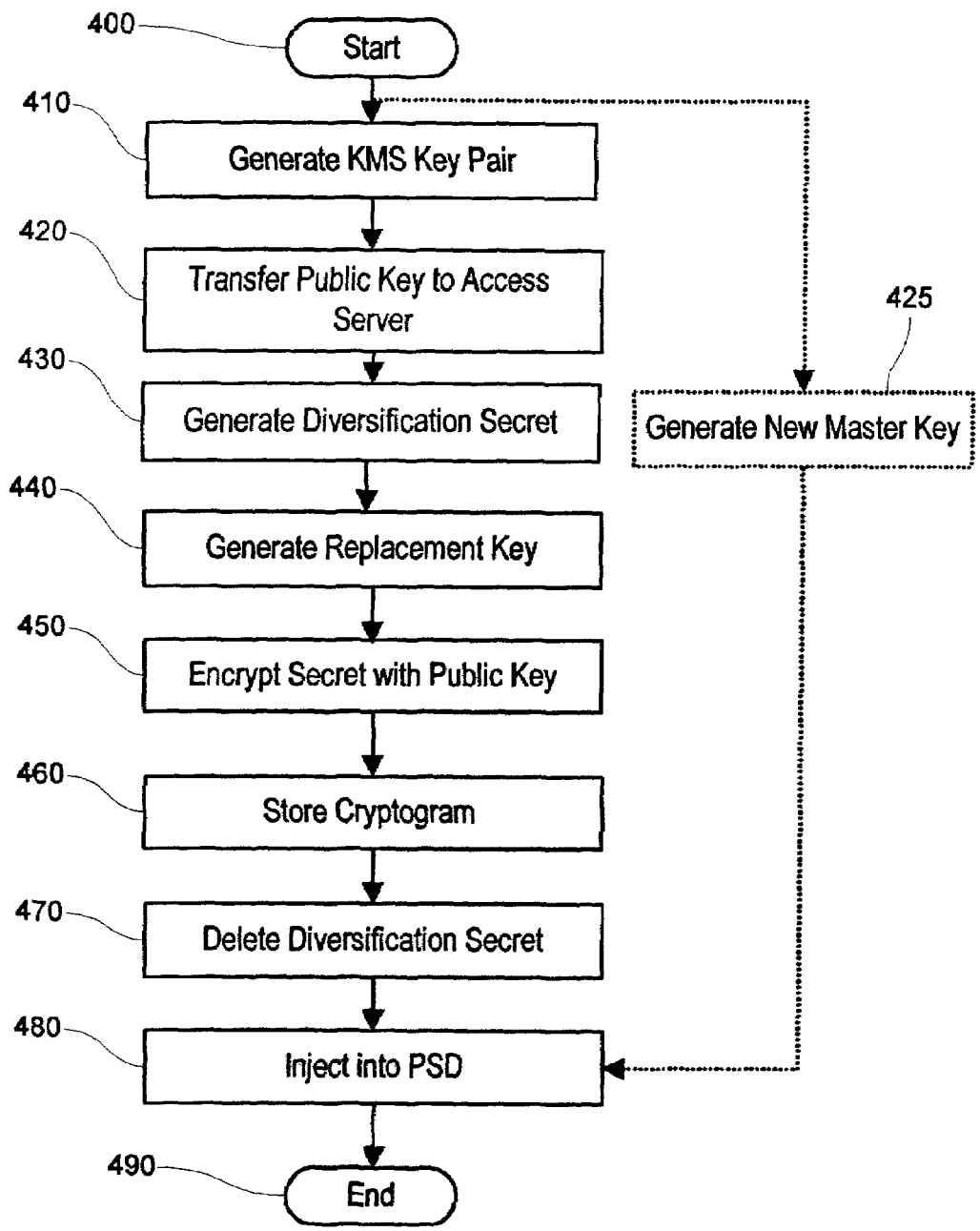
FIG. 4—is a flow chart illustrating the generation of a replacement key and secure storage of a diversification secret necessary to regenerate the replacement key.

In FIG. 4, a flow chart is shown which describes the initial key replacement key generation process. The process is initiated 400 by generation 410 of an asymmetric key pair by the key management server (KMS). In the preferred embodiment of the invention, the key pair generation process occurs within the secure domain of an HSM. The resulting public key is transferred 420 to an access server and preferably imported into the secure domain of second HSM associated with the access server. A random number is generated by the second HSM associated with the access server, which will be used as a diversification secret 430.

In a parallel operation, an initial master key is generated 425 at the same time as the initial replacement key generation. This operation may occur within the HSM associated with the access server, HSM associated with the key management server or from another secure server. Once the initial master key is generated, it is then injected 480 into the secure domain of the target PSD and registered with the PSD's security executive.

The random number generated at 430 is used to diversify a master replacement key data block, which produces 440 the replacement key. The diversification secret is encrypted 450 by the HSM associated with the access server using the public key and stored locally 460 on the access server and associated with the target PSD by its internal identification number or some other unique attribute. The original diversification secret is then deleted 470 without leaving the secure domain of the first HSM.

Once the initial key replacement key is generated, it is then injected 480 into the secure domain of the target PSD and registered with the PSD's security executive. The PSD is released and the process ends 490.

Figure 5:
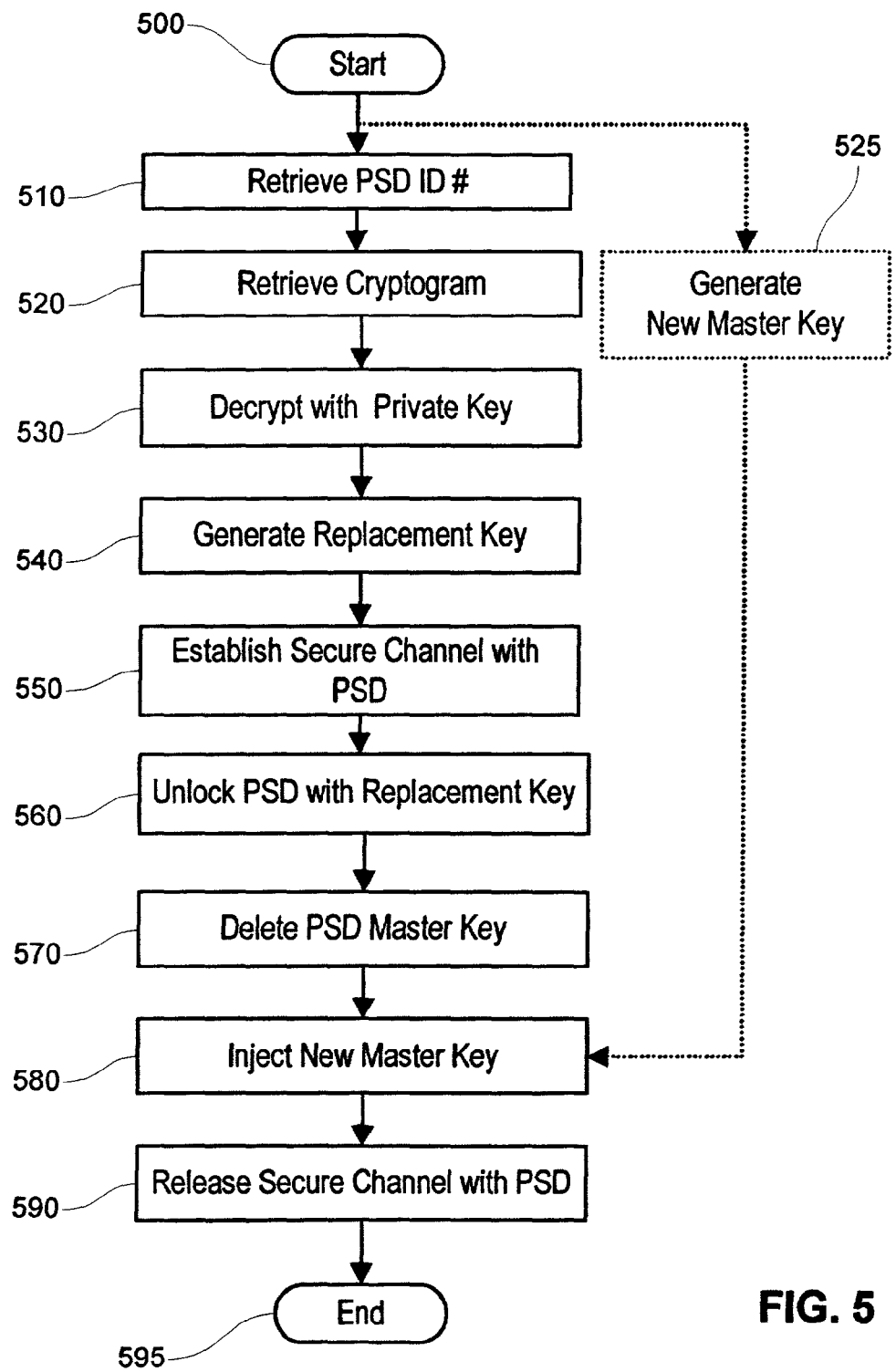
FIG. 5—is a flow chart illustrating the replacement key regeneration and PSD master key replacement.

In FIG. 5, a flow chart is shown which describes the post issuance key replacement process. The process is initiated 500 by the retrieval 510 of the PSD's unique identification number by an access server. The ID number is used to retrieve the encrypted secret 520 from storage by cross-referencing the PSD ID with the file containing the applicable cryptogram. A new master key is generated at this time as well 525. The encrypted secret is decrypted 530 using a private key previously received from a key management server, revealing a random number. The resulting random number is used to diversify a master replacement key data block, which regenerates a symmetric replacement key 540.

A secure channel is then established 550 between an access server HSM and the target PSD where the regenerated replacement key is used to unlock the PSD's security executive 560. The existing master key is then deleted 570 and a new master key is injected and registered with the PSD's security executive 580. The security executive is then closed and the secure communications channel with the PSD is terminated 590, which ends the replacement process 595.

The foregoing described embodiments of the invention are provided as illustrations and descriptions. They are not intended to limit the invention to precise form described. In particular, it is contemplated that functional implementation of the invention described herein may be implemented equivalently in hardware, software, firmware, and/or other available functional components or building blocks.

Other variations and embodiments are possible in light of above teachings, and it is not intended that this Detailed Description limit the scope of invention, but rather by the claims following herein.

The invention claimed is:

1. A data processing system for initially generating and installing at least one personal security device PSD master key replacement key and at least one PSD master key inside at least one PSD, said system comprising:
a first server including a data storage section, wherein said first server is functionally connected to a first hardware security module HSM and a PSD writer;
said PSD writer functionally connected to said first server and said at least one PSD;
said at least one PSD including a non-mutable unique identification number to be sent to said first HSM, a security executive, a first high level key slot and a second high level key slot, wherein said PSD is functionally connected to said PSD writer;
said first HSM including at least one stored public key, at least one stored master key data block, at least one stored master key replacement key data block and a random number generator that generates a random number, wherein said first HSM is functionally connected to said first server;
said first HSM comprising a first diversification section that uses said random number to diversify said master key replacement key data block, which generates a unique key replacement key associated with said non-mutable unique identification number.

2. The system according to claim 1, wherein said HSM comprises an encrypting section that encrypts said random number using said at least one stored public key, which generates a unique cryptogram associated with said non-mutable unique identification number.

3. The system according to claim 2, wherein said unique cryptogram is stored on said first server.

4. The system according to claim 1, wherein said random number is deleted inside said first HSM.

5. The system according to claim 1, comprising a first transfer section that transfers to said PSD writer and injects into said at least one PSD said unique key replacement key.

6. The system according to claim 5, wherein said unique key replacement key is registered with said security executive and installed in said first high level key slot.

7. The system according to claim 6, wherein said unique key replacement key is registered with said security executive and installed in said second high level key slot.

8. The system according to claim 1, wherein said HSM comprises a second diversification section that uses said unique identification number to diversify said at least one stored master key data block, which generates a unique master key.

9. The system according to claim 8, comprising a second transfer section that transfers to said PSD writer and injects into said at least one PSD said unique master key.

10. The system according to claim 9, wherein said unique master key is registered with said security executive and installed in said second high level key slot.

11. The system according to claim 10, wherein said unique master key is registered with said security executive and installed in said first high level key slot.

12. A data processing system for post issuance master key replacement for at least one personal security device (PSD), said system comprising:
a client functionally connected to said at least one PSD and in secure communications with a first server;
said at least one PSD including a non-mutable unique identification number, a pre-installed key replacement key, an active master key and a security executive, wherein said PSD is functionally connected to said client;
a first server including at least one stored unique cryptogram associated with said non-mutable unique identification number, wherein said first server is functionally connected to a first hardware security module HSM and in secure communications with said client;
a second server functionally connected to a second HSM;
said first HSM including a cryptographic section, a key generation and key transfer section, wherein said first HSM is functionally connected to said first server;
said second HSM including a cryptographic section, a master key replacement key data block, a master key data block, a key generation and key transfer section, at least one stored private key, wherein said second HSM is functionally connected to said second server;
a first transfer section that securely transfers said master key replacement key data block, said master key data block, and said at least one stored private key from said second HSM to said first HSM;
a second transfer section that transfers said non-mutable unique identification number to said first server and a retrieving section that retrieves said at least one stored unique cryptogram corresponding to said non-mutable unique identification number;
a third transfer section that transfers said at least one stored unique cryptogram and said non-mutable unique identification number from said first server to said first HSM;
a decrypting section that uses said at least one stored private key to decrypt said at least one stored unique cryptogram, resulting in a random number specific to said at least one PSD; and
a first diversification section that uses said random number to diversify said master key replacement key data block, generating a master key replacement key specific to said at least one PSD.

13. The system according to claim 12, comprising a second diversification section that uses said non-mutable unique identification number to diversify said master key data block, generating a new master key specific to said at least one PSD.

14. The system according to claim 12, comprising a fourth transfer section that securely transfers said master key replacement key to said PSD and said security executive comprises a comparison section that compares said master key replacement key to said pre-installed key replacement key.

15. The system according to claim 14, comprising an unlocking section that unlocks said security executive upon a match between said master key replacement key and said pre-installed key replacement key.

16. The system according to claim 15, wherein said active master key is deleted from said at least one PSD.

17. The system according to claim 16, comprising a transfer section that securely transfers said new master key, installs said new master key inside said at least one PSD and registers said new master key with said security executive.

18. The system according to claim 17, comprising a section that relocks said security executive following installation of said new master key.

19. The system according to claim 12, wherein said secure transfer occurs at said second server.

20. The system according to claim 19, wherein said secure transfer occurs at said first server.

21. A method for initially generating and installing a master key replacement key and a master key for at least one personal security device (PSD), said method comprising:
receiving a unique PSD identification number by a first data processing device,
generating a master key data block, a master key replacement key data block and asymmetric key pair by a second data processing device,
transferring said master key data block, said master key replacement key data block and a public key of said asymmetric key pair from said second data processing device to said first data processing device,
generating a random number by said first data processing device,
diversifying said master key replacement data block using said random number and generating a replacement key by said first data processing device,
encrypting said random number with said public key, forming a cryptogram by said first data processing device,
associating said cryptogram with said unique PSD identification number by said first data processing device,
storing said cryptogram by said first data processing device,
deleting said random number from said first data processing device,
diversifying said master key data block using said unique PSD identification number and generating a master key by said first data processing device,
operatively installing said master key replacement key and said master key inside said at least one PSD by said first data processing device.

22. The method according to claim 21, wherein said first data processing device is an access server.

23. The method according to claim 22, wherein said first data processing device is a first hardware security module HSM functionally connected to said access server.

24. The method according to claim 21, wherein said second data processing device is a key management server.

25. The method according to claim 24, wherein said second data processing device is a second hardware security module HSM functionally connected to said key management server.

26. The method according to claim 25, wherein said second data processing device is said second HSM functionally connected to said access server.

27. A method for post issuance master key replacement for at least one personal security device (PSD), said method comprising:
receiving a unique PSD identification number by a first data processing device,
generating a new master key data block, a master key replacement key data block by a second data processing device,
transferring said new master key data block, said master key replacement key data block and a private key from said second data processing device to said first data processing device,
cross-referencing said unique PSD identification number with a stored cryptogram associated with said at least one PSD by said first data processing device,
retrieving and decrypting said cross-referenced cryptogram using said private key, forming a random number,
diversifying said master key replacement data block using said random number and generating a master key replacement key by said first data processing device,
diversifying said master key data block using said unique PSD identification number and generating a new master key by said first data processing device,
establishing a secure channel with said at least one PSD by said first data processing device,
unlocking a security executive associated with said at least one PSD, using said master key replacement key by said first data processing device,
deleting an existing master key by said first data processing device,
installing said new master key by said first data processing device,
relocking said security executive by said first data processing device
releasing said secure channel to said at least one PSD by said first data processing device.

28. The method according to claim 27, wherein said first data processing device is an access server.

29. The method according to claim 28, wherein said first data processing device is a first hardware security module HSM functionally connected to said access server.

30. The method according to claim 27, wherein said second data processing device is a key management server.

31. The method according to claim 30, wherein said second data processing device is a second hardware security module HSM functionally connected to said key management server.

32. The method according to claim 31, wherein said second data processing device is said second HSM functionally connected to said access server.

* * * * *